March 13, 1934.    M. N. DAVIS    1,950,975
OPACIMETER AND METHOD OF MEASURING OPACITY
Filed Nov. 19, 1932
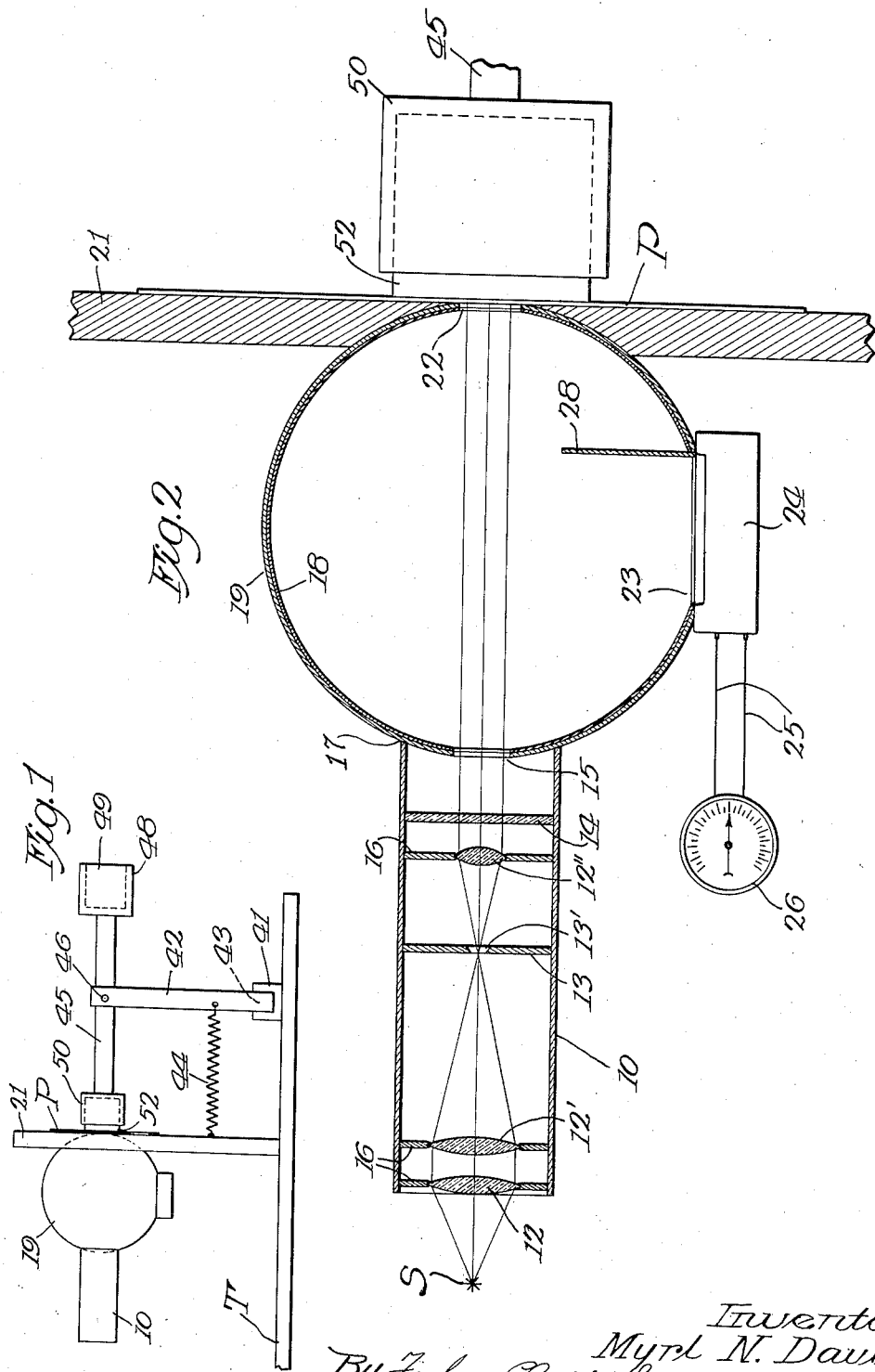
Inventor
Myrl N. Davis
By Fisher, Clapp, Soans & Pond, Attys.

Patented Mar. 13, 1934

1,950,975

UNITED STATES PATENT OFFICE 1,950,975

OPACIMETER AND METHOD OF MEASURING OPACITY

Myrl N. Davis, Appleton, Wis., assignor to Paper Patents Company, Neenah, Wis., a corporation of Wisconsin Application November 19, 1932, Serial No. 643,505

10 Claims. (Cl. 88—14)

My invention relates to instruments for measurement of opacity in translucent objects, especially in more or less translucent sheets, and particularly paper.

My present improved device is particularly designed for use in determining the "contrast ratio" of opacity, which is defined as the ratio of the intensity of light reflected from a single sheet of the tested material, when backed by a black object, simulating an ink spot, to the intensity of light reflected by the same sheet backed by a standard white reflector which reflects at least 97 or 98% of the light falling on it. By measuring the contrast ratio electrically, as in accordance with my invention, a determination of opacity may be arrived at which will be substantially reliable and accurate and will avoid all errors due to the human factor, such as where the eye is depended upon.

Objects of my invention, therefore, are to produce a device and method for determining the contrast ratio of opacity accurately, rapidly, efficiently and without discomfort or tiring of the operator.

Various other objects and advantages will become apparent as the description proceeds.

Referring now to the drawing forming part of this specification and illustrating a preferred embodiment of my invention:

Fig. 1 is a more or less diagrammatic elevational view of a preferred embodiment of my invention, and Fig. 2 is a detailed longitudinal sectional view of a portion of the apparatus.

S is a source of light, such as a suitable lamp. The numeral 10 represents a lightproof tubular member, the inner surface of which is blackened, for housing an optical system, which may conveniently consist of a pair of lenses 12 and 12', a diaphragm 13 having an aperture 13' therein, a third lens 12", and an optical filter 14. The lenses are supported by suitable means, such as plates 16 or the like, attached to the inside of the tube 10. It will be understood that the optical system may take various forms, the principal function thereof being to direct a beam of light, preferably of substantially parallel rays through an aperture 15 of a hollow body 19, to which the tube 10 is attached, making a light-proof joint 17 therewith. The hollow body 19 is preferably spherical but may be cubical or otherwise shaped, and may be formed of sheet metal or any other suitable material and is preferably lined throughout, as indicated at 18, with a suitable white surfacing material, so chosen as to be diffusely reflecting. This hollow body, which will henceforth be referred to herein as the "integrator", is supported by means of a substantially vertical board 21 or the like mounted on a table or bench T.

The integrator is provided with an aperture 22 in the wall thereof opposite the opening 15 and is also provided with an opening 23 in the wall thereof intermediate the openings 15 and 22. Arranged outside the integrator closely adjacent the outer wall thereof is a photoelectric cell 24. The opening 23 is of such size as to expose substantially all of the light-sensitive area of the cell 24, while the opening 15 is made as small as possible, in order to avoid undue absorption or dispersion of light at this point.

The cell 24 which is connected by means of a suitable electrical circuit, including conductors 25, to a device 26 for measuring a minute electric current, such as a microammeter, is preferably of such a type as generates its own electro-motive force, the magnitude of the current generated being preferably proportional to the intensity of light incident upon the cell.

Arranged inside the integrator 19 adjacent the opening 23 and between said opening and the opening 22 is a screen 28, which may be circular or otherwise shaped to intercept any rays which might be reflected through the opening 22 to the cell 24. The purpose of this is to prevent the incidence on the cell 24 of any rays except those which are reflected from the inner surface 18 of the integrator.

Referring now to Figure 1, it will be noted that the support 21 is mounted on a table or bench T, and also mounted on this table and space from the support is a suitable bracket 41 which carries an arm 42, pivoted as at 43. A tension helical spring 44 connects the arm 42 with the support 21. Another arm 45 is pivotally connected adjacent its center of mass as at 46 to the arm 42, the arm 45 carrying adjacent one end a hollow body 48, which may be a box-like member open at its outer end 49 and lined interiorly with a black non-reflecting material, such as velvet or the like. Adjacent the other end of the arm 45 is secured a receptacle 50 for carrying a white object 52, such as a block of magnesium carbonate or the like.

In the use of my device, a concentrated source of light S is established outside of the system, which may be the filament of a suitable lamp the light output of which will not very substantially during a test. The material to be tested, such as sheet P of paper or other translucent material, is placed adjacent the support 21, and the arm 45 is arranged so that this material is backed up by means of a block 52 of standard white material, usually a block of magnesium carbonate. It will be seen that the light from the source S passes into the optical system within the tube 10 whence it is transmitted through the integrator to the surface of the sheet P in a beam which at the aperture 22 will be of a diameter not greater than this aperture. From this surface the light is reflected back in various directions to the lining 18 of the integrator, from which it is diffusely reflected through the aperture 23 and upon the photoelectric cell 24. A reading is taken of the ammeter 26. The arm 42 is then rotated about its pivot 43 and after the carrier 50 has cleared the support 21, the arm 45 is rotated and the black object 48 is moved into position backing up the sample. The ammeter 26 is then read again and the quotient of the second reading divided by the first represents the contrast ratio of opacity of the particular specimen. The order of the readings may, of course, be reversed.

It will be understood, of course, that the opening 22 is completely covered by the black or white reflector disposed above the specimen P, in order that there may be no loss of reflected light, and also that the sample P must completely cover the opening 22.

The surfacing material 18, which is preferably white matt, serves to distribute the light reflected from the specimen so that ultimately the intensity of the illumination striking any portion of the inner wall of the integrator and the opening 23 will be equal to that striking any other portion and will thus be a measure of the light reflected at the surface of the sample, regardless of the direction in which the initial reflection took place. The screen 28, by intercepting any direct rays reflected from the sample toward the opening 23 obviates a possibility of serious error.

Although it is not so stated explicity in the definition of contrast ratio, it is assumed that all light intensities are to be measured by or compared with the eye of an observer possessed of normal vision. Since the photoelectric cell 24 reacts to equal intensities of colored light in a way which, in general, differs from the reaction of the normal human eye, this is compensated for by the use of a suitable color filter 14. Instead of this arrangement, a cell might be used which would react substantially similarly to the human eye.

Measurement of opacity in accordance with my invention results in more rapid and accurate determinations than with previously known methods and instruments, inasmuch as I am able to make quick successive measurements of the intensity of light reflected from the sample under like electrical conditions when backed by white and black objects, the incident light coming from a direction perpendicular to the surface of the sheet and being reflected in all directions.

Various changes and variations coming within the spirit of my invention will probably suggest themselves to those skilled in the art. Hence, I do not wish to be limited to the specific details herein shown and described, except to the extent indicated by the appended claims, which are to be interpreted as broadly as the state of the art will permit.

I claim as my invention:

1. A method of determining contrast ratio of opacity, comprising projecting a beam of light upon the surface of a sheet whose opacity is to be measured, in such a manner that light will be reflected from said surface upon a normally unilluminated diffusely reflecting surface, and, under like electrical conditions, electrically measuring the brightness of the light reflected from said last-mentioned surface when the sheet is backed by a white object and by a black object, respectively, to obtain the ratio of said intensities.

2. An opacimeter comprising a hollow body having a pair of oppositely disposed openings and a diffusely reflecting white inner surface, means for projecting a concentrated beam of light through said hollow body via said openings and upon a sheet located outside said body over the light exit opening, whereby the light may be reflected from said sample to the inner surface of the hollow body, a photoelectric cell arranged so as to receive light reflected from said inner surface, and means for registering the electrical variations of said cell.

3. An opacimeter comprising a hollow body having an inner surface diffusely reflecting light, means adjacent one end of said body for seating a sample of material to be tested for opacity, means opposite said seat for transmitting a beam of light through said hollow body substantially normally to the surface of the sample, whereby light may be reflected from said sample to said inner surface of the hollow body said hollow body as to its interior being otherwise not illuminated, a photoelectric cell arranged to receive light reflected from said inner surface, and means for registering the electrical variations of said cell.

4. In combination with a device as defined in claim 2, means for shielding said cell from light directly reflected from the sample.

5. In combination with a device as defined in claim 3, means for shielding said cell from light directly reflected from the sample.

6. An opacimeter comprising a hollow body having an inner surface diffusely reflecting light, said body having an opening adapted to seat a sample to be tested, an opening opposite said first opening for the transmission of a beam of light to said sample through said body, an intermediate opening, an inwardly facing photoelectric cell arranged outside said intermediate opening closely adjacent to said hollow body, means for registering electrical variations of said cell, and means for shielding said cell from rays reflected directly from the sample.

7. An opacimeter comprising a closed, hollow body having an interior diffusely reflecting surface and with two oppositely disposed openings in its wall, means for holding a sample at one of said openings, means for illuminating the sample through the other opening, means for selectively holding different background objects behind said sample, means for measuring the brightness of the light reflected from said diffusely reflecting surface, said last named means comprising a light-sensitive cell and associated indicating means, and means for shielding said cell from rays reflected directly from the sample.

8. A method as defined in claim 1, wherein the light from said diffusely reflecting surface is reflected upon a photo-electric element, and wherein said element is substantially shielded from other light.

9. A method of determining contrast ratio of opacity, which comprises projecting light rays upon an area of a sample whose opacity is to be measured, successively placing a white object and a black object behind said area and measuring the brightness of the light reflected by said area when it is backed by said white and black objects, respectively.

10. A method of determining contrast ratio of opacity, comprising projecting a beam of light upon a sheet whose opacity is to be measured, so that light will be reflected from said sheet and, under like electrical conditions, measuring electrically the brightness of the light reflected from said sheet when the sheet is backed by a white object and by a black object, respectively, to obtain the ratio of said intensities.

MYRL N. DAVIS.